United States Patent [19]
Maturaporn

[11] Patent Number: 5,796,460
[45] Date of Patent: Aug. 18, 1998

[54] EYEGLASS PROTECTOR

[75] Inventor: Thawatchai Maturaporn, Bangkok, Thailand

[73] Assignee: Thai Hospital Products Co. Ltd., Bangkok, Thailand

[21] Appl. No.: 901,625

[22] Filed: Jul. 28, 1997

[51] Int. Cl.$^6$ .................................................. G02C 1/00
[52] U.S. Cl. .............................. 351/86; 351/83; 351/106
[58] Field of Search ................................ 351/86, 83, 103, 351/106, 41, 156, 157, 158, 47, 48, 57, 58

[56] References Cited

U.S. PATENT DOCUMENTS 5,386,254  1/1995  Kahaney ............................ 351/60

Primary Examiner—Hung X. Dang
Attorney, Agent, or Firm—Ezra Sutton

[57] ABSTRACT

An eyeglass protector for protecting the eyeglasses worn by a wearer which includes one-piece flexible band member made of a durable plastic having a center section and two temple sections. The lower surface of the band member rests on the upper surface of the eyeglass frame. A bendable, transparent plastic visor shield for covering both lenses of a pair of eyeglasses is detachably connected to the center section of the band member by a plurality of connecting pin members and a plurality of pin covers. The band member also includes a pair of bracing elements for retaining the band member in a curved configuration.

10 Claims, 6 Drawing Sheets

5,796,460

1

EYEGLASS PROTECTOR

FIELD OF THE INVENTION

This invention relates to an eyeglass protector for protecting the eyeglasses of a wearer. More particularly, the eyeglass protector is light-weight, durable, and disposable after use.

BACKGROUND OF THE INVENTION

Protective eye wear comes in many styles, designs and configurations for the workplace, sports, hobbies, home and the like. Protective eye wear for the work place includes welding masks, chemical and explosion eye goggles for placement over glasses, protective lens coverings, and the like. Protective eye wear for sports includes sports masks, sports eye goggles having prescription lenses and the like.

The aforementioned protective eye wear products are usually expensive, contain several moving parts and have problems in use when worn with the users' prescription eyeglasses.

There remains a need for an eyeglass protector that is light-weight and durable in design; and has a simple configuration in which the eyeglass protector is able to fit on any style of eyeglasses. In addition, the eyeglass protector should be readily disposable after use.

DESCRIPTION OF THE PRIOR ART

Although the prior art discloses many types of protective eye wear, none of such prior art includes the structure, functions, features and advantages of the present invention.

Accordingly, it is an object of the present invention to provide an eyeglass protector that is easy to assemble having only three component parts, that include a curved, flexible forehead band having a plurality of connecting pin members thereon; a bendable, transparent visor shield; and a plurality of pin covers for covering the plurality of connecting pin members once assembled.

Another object of the present invention is to provide an eyeglass protector that is durable and has no moving parts therein.

Another object of the present invention is to provide an eye glass protector that has a moldable forehead band made of plastic that retains its curved configuration by the use of a pair of bracing elements positioned in a precise location on the forehead band.

Another object of the present invention is to provide an eyeglass protector that is able to fit on any style of mens' and womens' eyeglasses and is in a stable position once the eyeglass protector is properly placed on the eyeglass frames.

Another object of the present invention is to provide an eyeglass protector that is light-weight, protective in use, and disposable after use has been concluded.

A further object of the present invention is to provide an eyeglass protector that can be mass produced in an automated and economical manner, and is readily affordable by the user.

SUMMARY OF THE INVENTION

In accordance with the present invention there is provided an eyeglass protector for protecting the eyeglasses worn by a wearer which includes a curved, flexible band member made of a durable plastic having a center section and two temple sections. The lower surface of the band member rests on the upper surface of the eyeglass frame. A bendable, transparent plastic visor shield for covering both lenses of a pair of eyeglasses is detachably connected to the center section of the band member by a plurality of connecting pin members and a plurality of pin covers. The band member also includes a pair of bracing elements for retaining the band member in a curved configuration.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein:

FIG. 3A is an enlarged partial exploded view of the eyeglass protector of the present invention showing the cover pin having a spherical head, and a bottom wall with a centrally located circular opening for detachably connecting to a pin connecting member being integrally attached to the outer wall surface of the forehead band;

DETAILED DESCRIPTION OF THE PREFERRED EMBODIMENT

Figure 1:
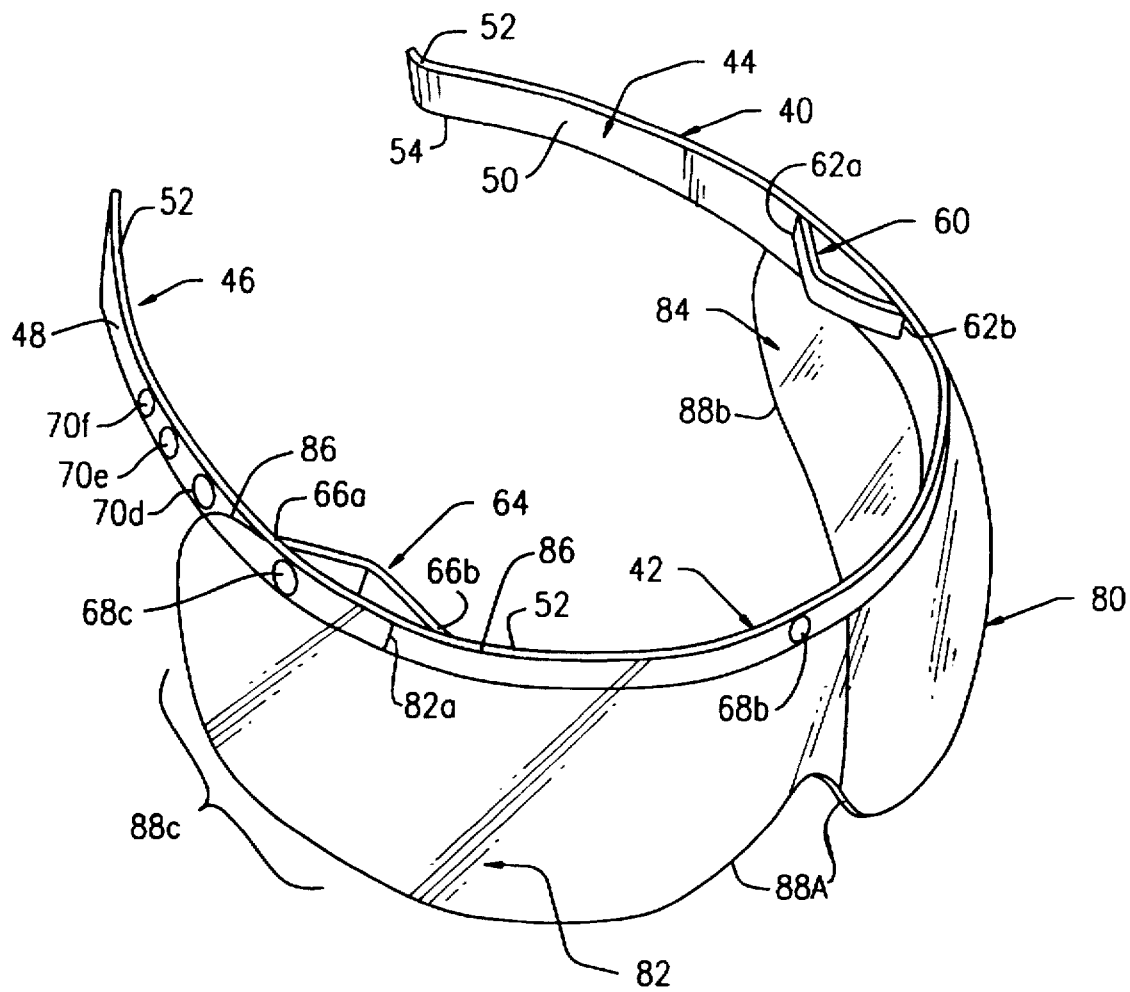
FIG. 1 is a front perspective view of the eyeglass protector of the preferred embodiment of the present invention showing the curved, flexible forehead band; and the bendable, transparent plastic lens section attached to the forehead band.
Figure 2:
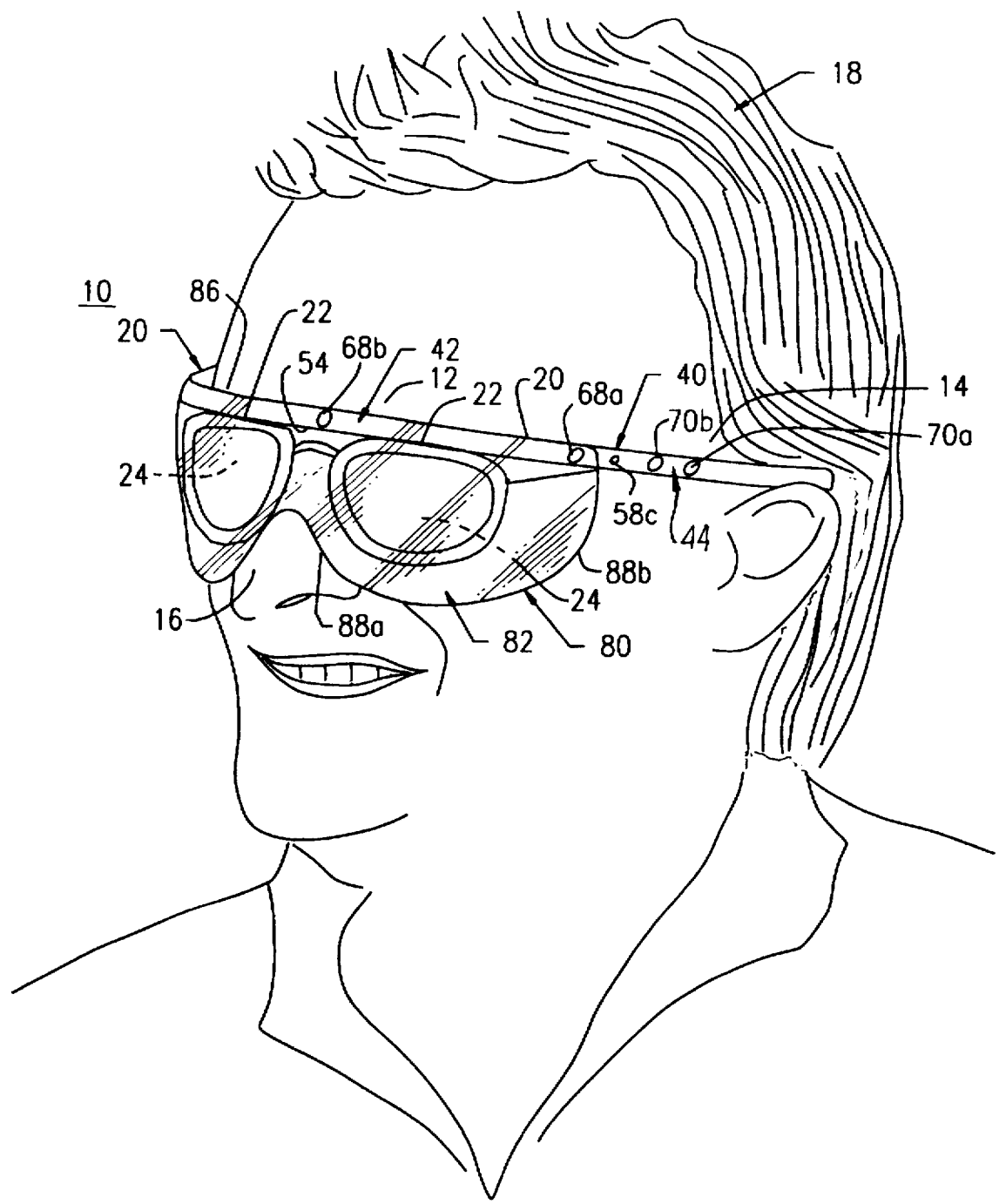
FIG. 2 is a front perspective view of the eyeglass protector of the present invention showing its component parts thereon, and in operational use by the wearer.

An eyeglass protector 10 and its component parts of the preferred embodiment of the present invention are used for protecting the eyeglasses 20 worn by the wearer. The eyeglass protector and its component parts are represented in detail by FIGS. 1 through 7 of the drawings. As shown in FIG. 2, the eyeglass protector 10 is positioned on the wearer's eyeglasses 20 such that the bottom perimeter wall edge 54 of band member 40 rests on the top (upper) rim wall edge 22 of eyeglasses 20 for the proper protective use of eyeglass protector 10. The eyeglass protector 10 includes only three component elements: a curved, flexible forehead band member 40; a bendable and transparent plastic visor shield 80 for covering both lenses 24 of eyeglasses 20; and a plurality of pin covers 68a to 68c and 70a to 70f for attaching and covering a plurality of pin connecting members 56a to 56c and 58a to 58f, respectively, of band member 40.

Figure 3:
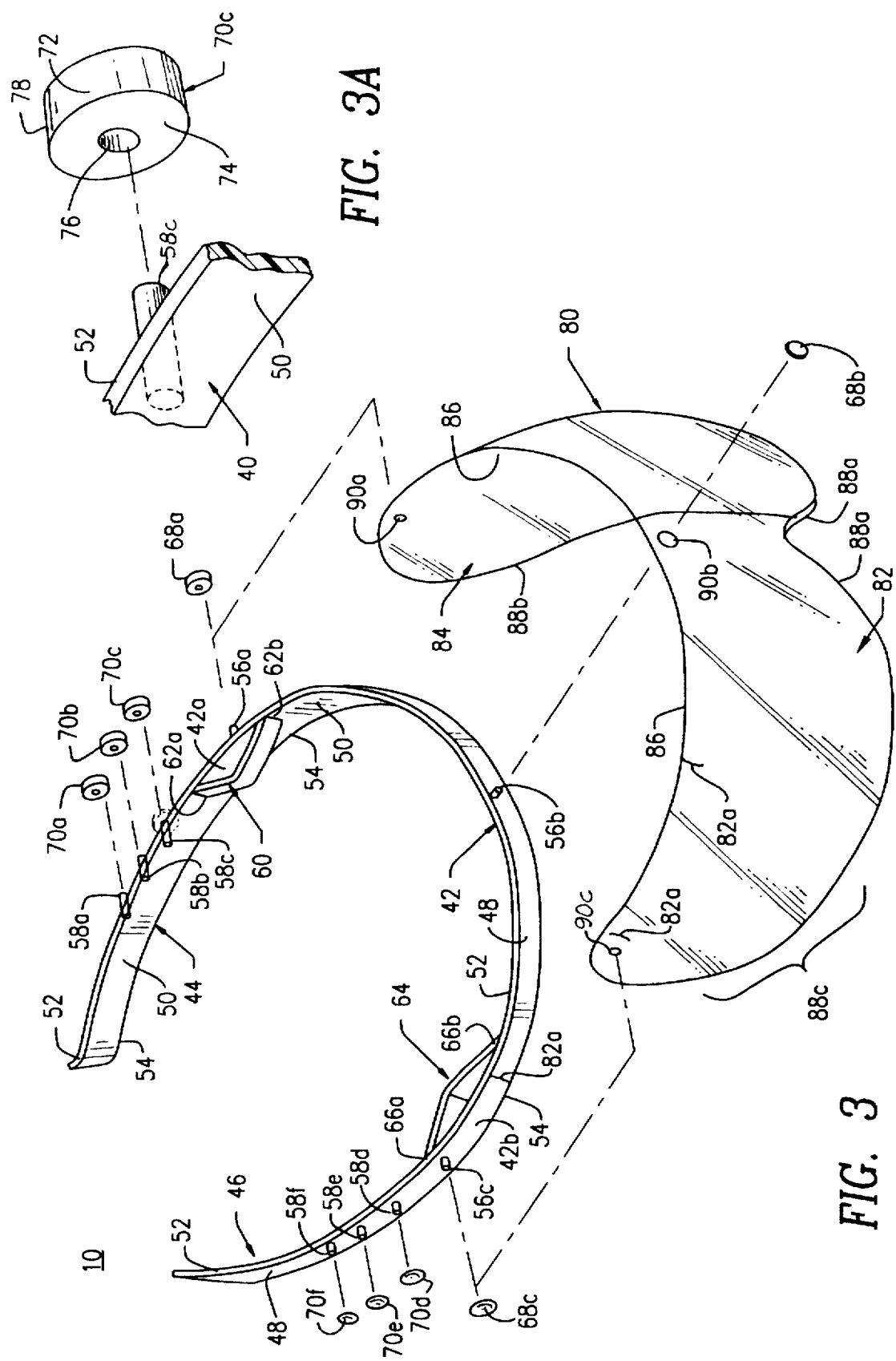
FIG. 3 is an exploded front perspective view of the eyeglass protector of the present invention showing the flexible forehead band having connecting pin members thereon; a plurality of pin covers; and the bendable and transparent plastic lens section having receiving hole openings for the connecting pin members of the forehead band.
Figure 5:
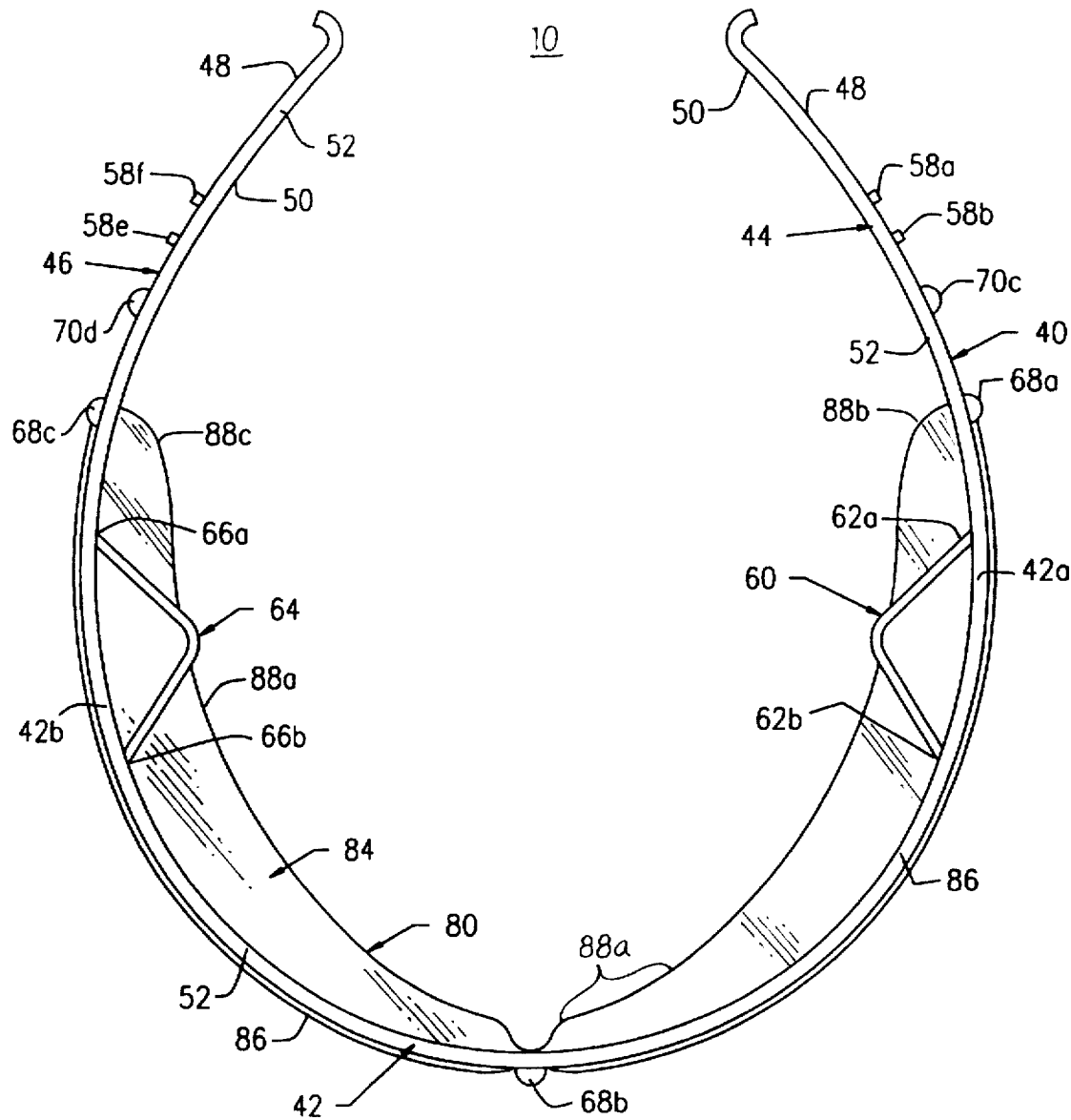
FIG. 5 is a top plan view of the eyeglass protector of the present invention showing its component parts thereon.
Figure 7:
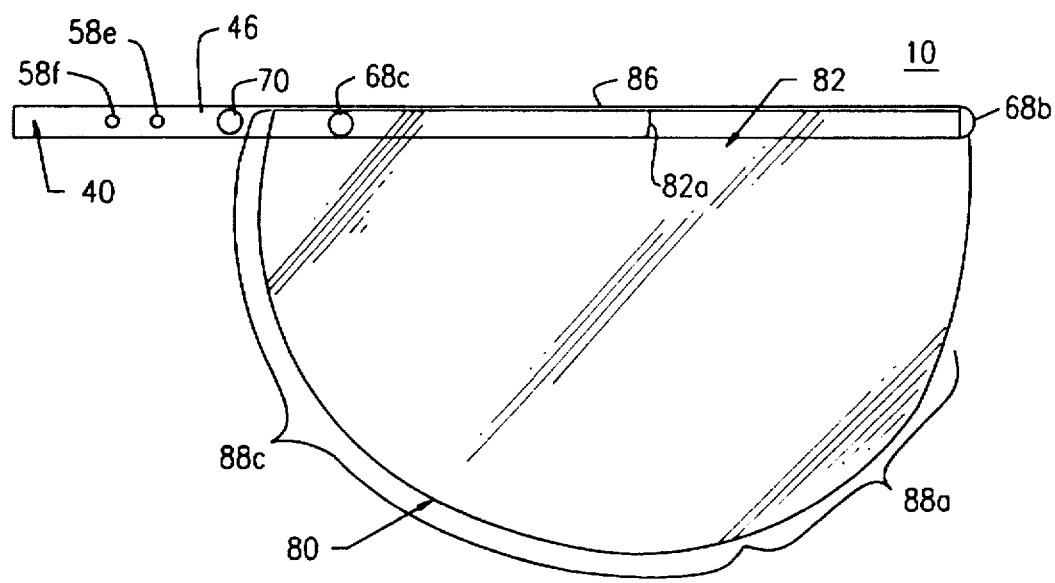
FIG. 7 is a side elevational view of the eyeglass protector of the present invention showing its component parts thereon.

Forehead band member 40 includes a center section 42 and two temple sections 44 and 46. Forehead band member 40 further includes an outer wall surface 48, an inner wall surface 50, a top perimeter wall edge 52 and a bottom perimeter wall edge 54. Outer wall surface 48 includes a first plurality of pin connecting members 56a, 56b, and 56c located on the center section 42 of band member 40. The first plurality of pin connecting members 56a to 56c are used for connecting the center section 42 of band member 40 to the visor shield 80 and receive pin covers 68a to 68c. Outer wall surface 48 further includes a second plurality of pin connecting members 58a to 58f located on the side temple sections 44 and 46 of band member 40. In particular, as shown in FIGS. 3, 5, and 7, pin connecting members 58a to 58c are spaced apart in a longitudinal array along the side temple section 44 of band member 40, and pin connecting members 58d to 58f are spaced apart in a longitudinal array along the side temple section 46 of band member 40. The second plurality of pin connecting members 58a to 58f are used for receiving additional pin covers 70a to 70f and are available as replacements for pin covers 68a to 68c.

Figure 4:
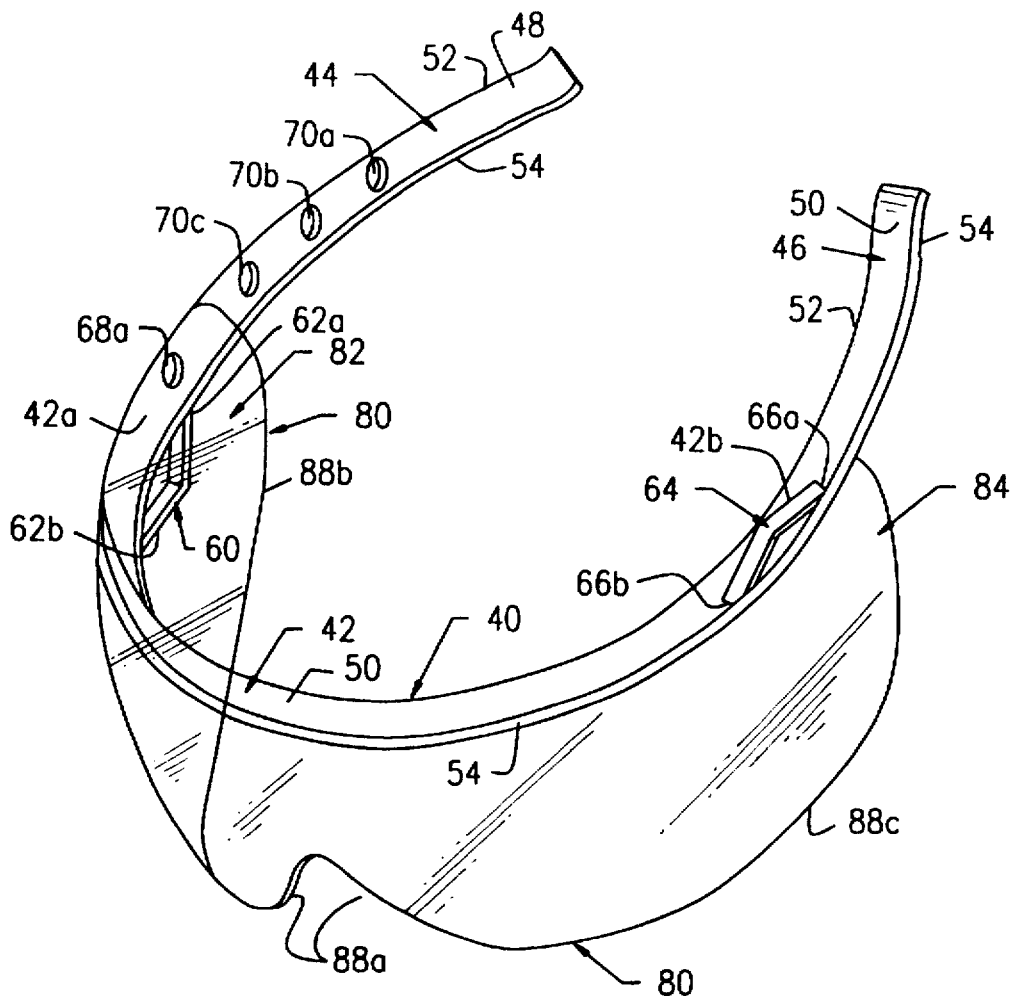
FIG. 4 is a rear perspective view of the eyeglass protector of the present invention showing its component parts thereon.

In addition, forehead band member 40 also includes a pair of retaining brace elements 60 and 64 for retaining the band member 40 in a curved configuration, as shown most clearly in FIG. 5 of the drawings. Bracing elements 60 and 64 are positioned at opposite ends 42a and 42 of center section 42. The brace ends 62a and 62b; and brace ends 66a and 66b of bracing elements 60 and 64, respectively, are integrally attached to the inner wall surface 50, as shown in FIGS. 1, 4, and 5 of the drawings.

Pin covers 68a to 68c and 70a to 70f, as shown in FIG. 3A, each include a semi-spherical top wall 72; a bottom wall surface 74 having a centrally located circular receiving opening 76 for pin connecting members 56a to 56c, and 58a to 58f; and a circular perimeter edge 78. In particular, the first plurality of pin covers 68a to 68c are used for covering and attaching to the first plurality of pin connecting members 56a to 56c after the connecting pin members 56a to 56c pass through the hole openings 90a to 90c of the visor shield 80. The second plurality of pin covers 70a to 70f which are attached to the second plurality of pin connecting members 58a to 58f may be used as replacement pin covers for any one of pin covers 68a to 68c, as shown in FIG. 3 of the drawings.

Visor shield 80 includes a front wall surface 82, a rear wall surface 84, an upper perimeter edge 86, a lower bottom perimeter edge 88a and side perimeter edges 88b and 88c. Visor shield 80 further includes a plurality of spaced-apart, connect hole openings 90a, 90b and 90c for receiving connecting pin members 56a, 56b and 56c respectively therein. The connect hole openings 90a to 90c are located and positioned on the upper wall area 82a of wall surface 82 and adjacent to the upper perimeter edge 86, as shown in FIG. 3 of the drawings.

OPERATION OF THE PRESENT INVENTION

Figure 6:
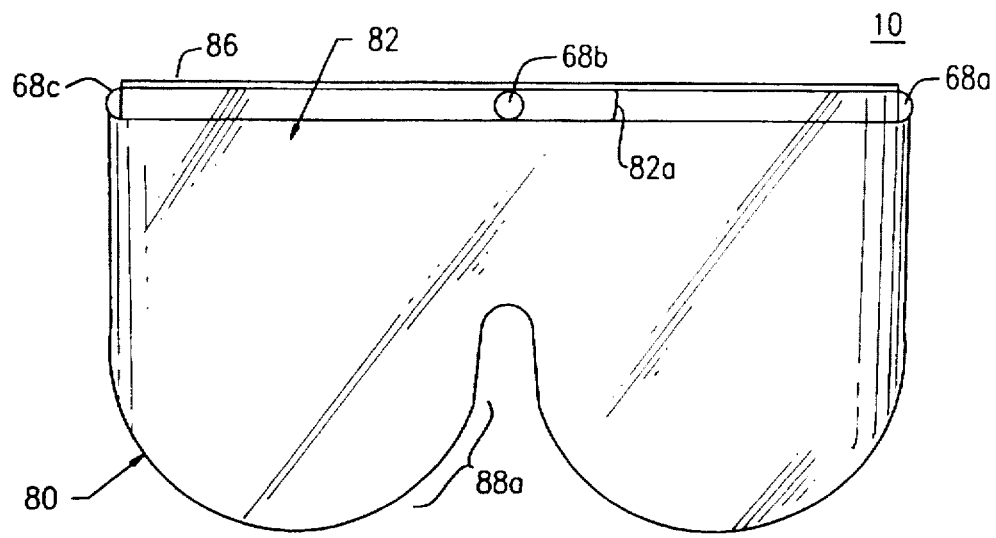
FIG. 6 is a front elevational view of the eyeglass protector of the present invention showing its component parts thereon.

In operation, the wearer first assembles the eyeglass protector 10 for use; and the second step is the positioning and wearing of the eyeglass protector 10 of the present invention. In assembly, the user, as shown in FIG. 3 of the drawings, simply places the plurality of connect hole openings 90a, 90b and 90c of visor shield 80 onto the first plurality of connecting pin members 56a, 56b and 56c, respectively; and then attaches the first plurality of pin covers 68a, 68b and 68c onto the aforementioned first plurality of connecting pin members 56a, 56b and 56c, respectively. Pin covers 68a, 68bc and 68c are positioned onto the outer wall surface 82 of visor shield 80 such that each bottom wall surface 74 and perimeter edge 78 of each pin cover 68a to 68c is in contact with the upper wall area 82a and adjacent to the upper perimeter edge 86 of visor shield 80, as shown in FIGS. 1, 5, and 6 of the drawings. As previously noted, any one of the second plurality of pin covers 70a to 70f may be used as a replacement pin cover for any one of the first plurality of pin covers 68a to 68c if they are lost during use.

To operate the eyeglass protector 10, as depicted in FIG. 2 of the drawings, the eyeglass protector is positioned on the rim wall edge 22 of the wearer's eyeglasses 20 such that the bottom perimeter wall edge 54 of band member 40 rests on the top (upper) rim wall edge 22 of eyeglasses 20 for proper protective use of the eyeglass protector 10. For proper placement, the temple sections 44 and 46 are adjacent to and in contact with the wearer's temple areas 14, and the center section 42 of band member 40 is adjacent to and in contact with the wearer's forehead area 12. The lower perimeter edge 88a rests on the wearer's nose 16, as shown in FIG. 2 of the drawings.

After several times of wearing, or even one time of wearing, the eyeglass protector 10 can be readily disposed of and a new eyeglass protector 10' may be assembled and made ready for use within minutes of assembling.

ADVANTAGES OF THE PRESENT INVENTION

Accordingly, an advantage of the present invention is that it provides for an eyeglass protector that is easy to assemble having only three component parts, that include a curved, flexible forehead band having a plurality of connecting pin members thereon; a bendable, transparent visor shield; and a plurality of pin covers for covering the plurality of connecting pin members once assembled.

Another advantage of the present invention is that it provides for an eyeglass protector that is durable and has no moving parts therein.

Another advantage of the present invention is that it provides for an eye glass protector that has a moldable forehead band made of plastic that retains its curved configuration by the use of a pair of bracing elements positioned in a precise location on the forehead band.

Another advantage of the present invention is that it provides for an eyeglass protector that is able to fit on any style of mens' and womens' eyeglasses and is in a stable position once the eyeglass protector is properly placed on the eyeglass frames.

Another advantage of the present invention is that it provides for an eyeglass protector that is light-weight, protective in use, and disposable after use has been concluded.

A further advantage of the present invention is that it provides for an eyeglass protector that can be mass produced in an automated and economical manner, and is readily affordable by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An eyeglass protector for protecting the eyeglasses worn by a wearer, comprising:

a) one-piece flexible band member made of a durable plastic and including a center section and two temple sections;

b) a bendable, transparent plastic visor shield for covering both lenses of a pair of eyeglasses;

c) means for detachably connecting said visor shield to said band member; and d) means for retaining said band member in a curved configuration.

2. An eyeglass protector in accordance with claim 1, wherein said means for detachably connecting include a first plurality of connecting pin members formed on said band member and co-acting holes formed on said visor shield for receiving said first plurality of connecting pin members, and a first plurality of pin covers for covering said connecting pin members after said connecting pin members pass through the holes of said visor shield.

3. An eyeglass protector in accordance with claim 2, further including a second plurality of connecting pin members formed on said band member and a second plurality of pin covers for covering said second plurality of connecting pin members.

4. An eyeglass protector in accordance with claim 3, wherein said second plurality of connecting pin members include six (6) connecting pin members.

5. An eyeglass protector in accordance with claim 3, wherein said second plurality of pin covers include six (6) pin covers.

6. An eyeglass protector in accordance with claim 2, further including means for storing replacement pin covers including a second plurality of connecting pin members formed on said temple sections of said band member for receiving and storing of said replacement pin covers.

7. An eyeglass protector in accordance with claim 2, wherein said first plurality of connecting pin members include three (3) connecting pin members.

8. An eyeglass protector in accordance with claim 2, wherein said first plurality of pin covers include three (3) pin covers.

9. An eyeglass protector in accordance with claim 1, wherein said means for retaining said band member in a curved configuration include a pair of bracing elements.

10. An eyeglass protector in accordance with claim 1, wherein said visor shield is an integral member for covering both lenses of a pair of eyeglasses.

* * * * *